United States Patent

[11] 3,610,782

| [72] | Inventor | James P. McGuire, III<br>Waltham, Mass. |
|---|---|---|
| [21] | Appl. No. | 864,106 |
| [22] | Filed | Oct. 6, 1969 |
| [45] | Patented | Oct. 5, 1971 |
| [73] | Assignee | Precision Control Products Corporation<br>Waltham, Mass. |

[54] CONTROLLED PUMP
5 Claims, 4 Drawing Figs.

[52] U.S. Cl. ................................................ 417/326,
417/45, 417/413, 417/415
[51] Int. Cl. ........................................... F04b 17/04,
F04b 49/08
[50] Field of Search ........................................ 417/45,
280, 326, 413, 415

[56] References Cited
UNITED STATES PATENTS

| 2,194,535 | 3/1940 | Von Deldon | 417/413 |
| 2,686,280 | 8/1954 | Strong et al. | 417/326 X |
| 3,118,383 | 1/1964 | Woodward | 417/45 |
| 3,162,134 | 12/1964 | Lovell | 417/326 |
| 3,221,798 | 12/1965 | Kofink | 417/326 X |
| 3,411,704 | 11/1968 | Hilgert et al. | 417/280 |

Primary Examiner—William L. Freeh
Attorney—Martin Kirkpatrick

ABSTRACT: An analog electrical signal-controlled pump having a reciprocating pumping element, pulse-operated means for reciprocating it at a rate proportional to the pulse rate of a pulse generator producing operating pulses at a predetermined rate from zero to a maximum and control means responsive to an analog electrical control signal, which establishes a predetermined pulse rate providing a rate of pump element reciprocation as a linear function of the control signal. The control means includes pump cutoff adjusting means for establishing a predetermined value of the control signal providing a zero pulse rate for cutting off flow through the pump and pump rate adjusting means for establishing a predetermined value of rate of change of the pulse rate with change of the control signal for varying the rate of change of flow through the pump in response to a change in the control signal. Preferably also provided is an adjustment for the stroke of the reciprocating pumping element for establishing a predetermined pumping volume per stroke.

CONTROLLED PUMP

This invention relates to pumps and more particularly to a novel controlled pump having a reciprocating pumping element.

There has long been a need, especially for proportioning and metering applications in process industries and the like, for a pump of the reciprocating type capable of ready adjustment over a complete range, both for pump cutoff and pumping rate of change, as a predetermined function of an electrical control signal. Although attempts have been made to provide such a pump, the resultant structures have all been deficient in one or more respects, and this has been especially so as to their failure to achieve a predetermined response with the sharp cutoff function needed for accurate metering operation.

It is, accordingly, a major object of the present invention to provide such a pump not subject to the above-noted deficiencies.

The above and further objects have been accomplished by the present invention by providing an analog electrical signal-controlled pump having a reciprocating pumping element, pulse-operated means for reciprocating it at a rate proportional to the pulse rate of operating pulses supplied thereto by pulse generator means producing operating pulses at a predetermined rate from zero to a maximum and control means responsive to an analog electrical control signal, which establishes a predetermined pulse rate providing a rate of pump element reciprocation as a predetermined function of the control signal. The control means includes pump cutoff adjusting means for establishing a predetermined value of the control signal providing a zero pulse rate for cutting off flow through the pump. It may also include pump rate adjusting means for establishing a predetermined value of rate of change of the pulse rate with change of the control signal for varying the rate of change of flow through the pump in response to a change in the control signal. Preferably, also provided is an adjustment for the stroke of the reciprocating pumping element for establishing a predetermined pumping volume per stroke.

For the purpose of more fully explaining the various objects and features of the invention, reference is now made to the following detailed description of a preferred embodiment thereof, together with the accompanying drawing wherein.

Figure 1:
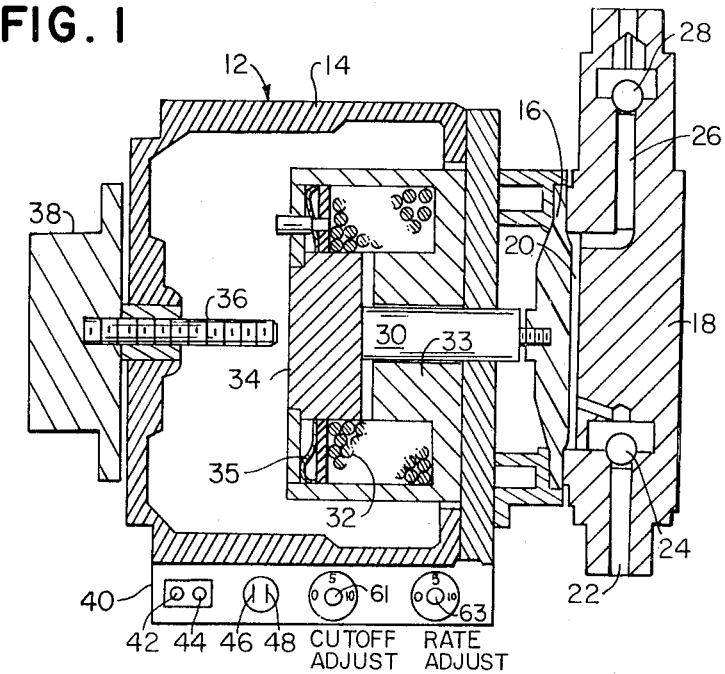
FIG. 1 is a cross-sectional elevation of the mechanical elements of a pump according to the present invention.

Referring first to FIG. 1, the mechanical and electromechanical pump elements shown therein consist of a pump head, generally designated 12, mounted on a chassis 40 containing the electrical elements of the pump, and having input signal terminals 42, 44, power terminals 46, 48 and control knobs 61, 63 carrying suitable indicia as hereinafter explained. Pump head 12 includes a frame 14 having mounted therein a reciprocating pumping element in the form of a diaphragm 16 forming one wall of a recessed housing 18 mounted on said frame and providing a pumping chamber 20. An inlet passage 22 having a check ball valve 24 is provided into said chamber and an outlet passage 26 having a check ball valve 28 is provided from said chamber. For reciprocating diaphragm 16, there is mounted centrally thereof a solenoid shaft 30 carrying an armature 34. Shaft 30 is energized for reciprocating movement by a surrounding coil 32 enclosed within fixed core 33 mounted within frame 14. A spring 35 is interposed between cores 32 and 33. Means are provided for adjusting the pump stroke for establishing a predetermined pumping volume per stroke in the form of adjusting screw 36 mounted in frame 14 and having mounted thereon a knob 38 for rotating said screw to set its free end to define the limit of the rear stroke of shaft 30.

Figure 2:
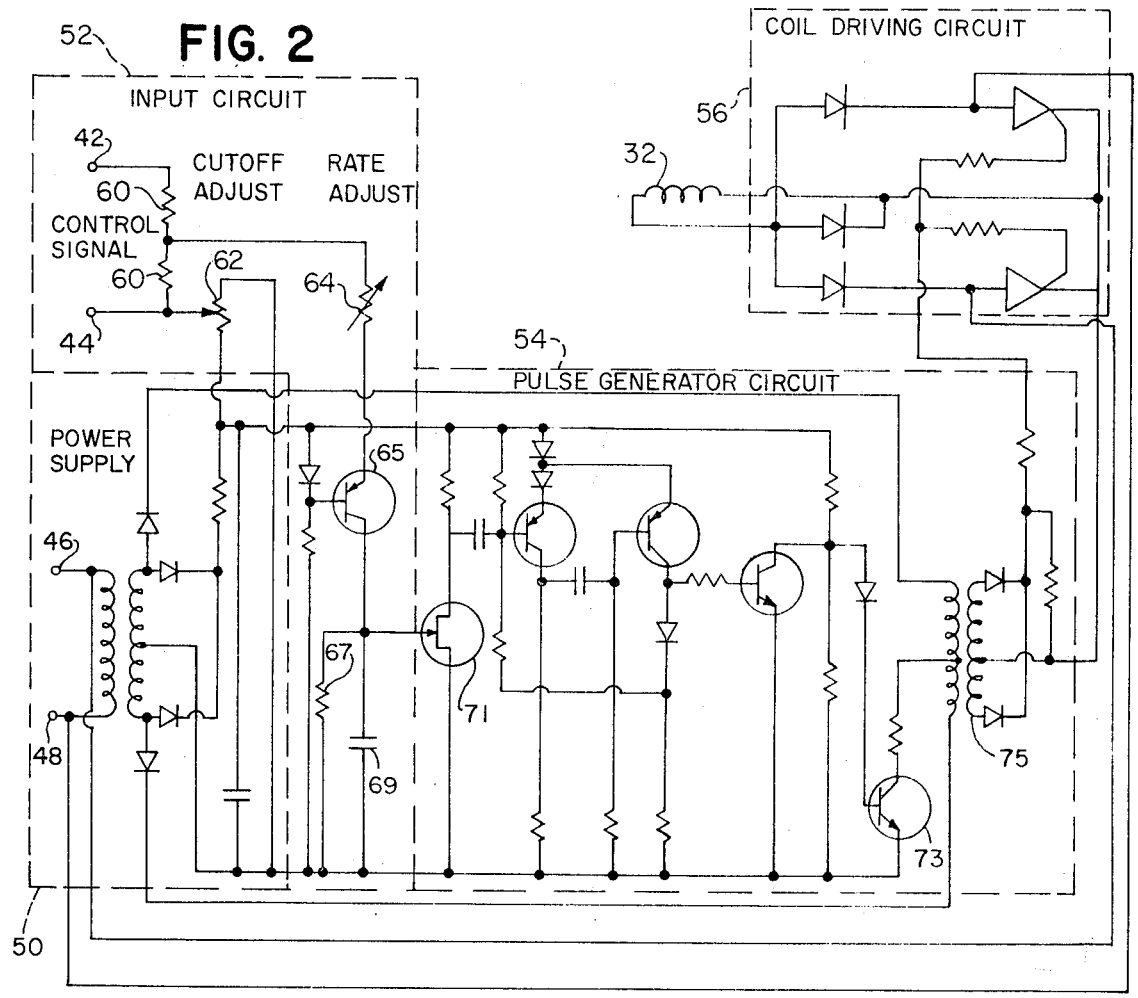
FIG. 2 is a circuit diagram of the electrical elements of the pump of FIG. 1 and FIGS. 3 and 4 are graphical representations, respectively, of pump cutoff and pumping rate of change as a linear function of an electrical control signal.

In FIG. 2 is shown a circuit diagram of the electrical elements of the pump of the invention. In general, the circuitry shown is well known and includes a power supply circuit 50 connected to power terminals 46, 48; an input circuit 52 connected to input terminals 42, 44 and having control knobs 61, 63 for adjusting elements thereof; a pulse generator circuit 54; and a coil-driving circuit 56 for energizing coil 32 to reciprocate shaft 30 and diaphragm 16.

More specifically as to certain aspects of such circuits, input circuit 52 includes a center-tapped resistor 60 for converting an input signal current impressed across its terminals 42, 44 to an input signal voltage for application to cutoff-adjusting resistor 62 and rate-adjusting resistor 64, such resistors being adjusted by their knobs 61, 63, respectively. Cutoff-adjusting resistor 62 functions to establish the amount of voltage from power supply 50 applied to one end of resistor 60, and rate-adjusting resistor 64 further establishes the current value to be applied to the emitter of transistor 65. Resistor 67, of high value of about 5 megohms, is connected between the collector of transistor 65 and ground to dissipate leakage currents for operation of transistor 65 in its generally linear operating region. As so modified, the current from the collector of transistor 65 is introduced to the pulse generator circuit where it charges capacitor 69 to cause pulse operation of transistor 71.

The time constant of pulse generator circuit 54 is determined by the circuit of transistor 65 including its collector resistor 67 and the capacitor 69. Otherwise pulse generator circuit 54 is conventional in its operation and operates transistor 73 to periodically turn on current from input terminals 46, 48 through the transformer of power supply circuit 50. The resulting AC pulse trains are fed through output isolation transformer 75, rectified and delivered to driving circuit 56 for solenoid coil 32.

Figure 3:
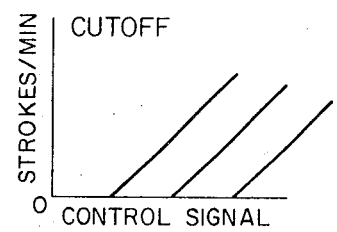
Figure 4:
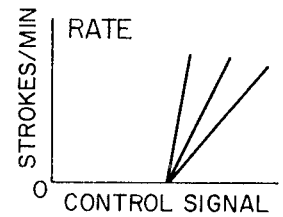

To operate the pump of FIGS. 1 and 2, the cutoff-adjusting and rate-adjusting resistors 62, 64 are first set to desired values by their control knobs 61, 63, respectively. This may be done, for example, by reference to graphical showings such as those of FIGS. 3 and 4 wherein the family of linear functions thereof appearing as a series of lines represents appropriate indicia carried on knobs 61 and 63. Thus, cutoff-adjusting resistor control knob 61 may have appropriate indicia (FIG. 3) in terms of the value of the analog electrical signal, such as an input current, at which the pump diaphragm 16 is stopped by providing a zero pulse rate from pulse generator circuit 54 and rate-adjusting resistor control knob 63 may have appropriate indicia (FIG. 4) indicating the slope of the linear or other predetermined functions to be selected for establishing a predetermined value of rate of change of the pulse rate of pulse generator circuit 54 with change of control signal for varying the rate of change of reciprocation of diaphragm 16 and hence pump flow.

A source of electric power is connected to terminals 46, 48 and input signal current is supplied to input circuit terminals 42, 44. The latter, in the most usual arrangement, would appear as a result of a measurement of a characteristic, such as fluid flow rate of a process system to which pump 12 is connected to supply metered liquid.

In operation, with an input current greater than cutoff value supplied to input circuit terminals 42, 44, the pulse-operated coil 32 reciprocates the pumping diaphragm 16 at a rate proportional to the pulse rate of operating pulses supplied to it from pulse generator circuit 54. As explained above, pulse generator circuit 54 is capable of generating pulses at a predetermined rate from a zero rate at which the pump is stopped, to a maximum rate determined by the pump characteristics, as controlled in response to the input control signal and the adjustable cutoff and rate resistors 62, 64 to provide a predetermined pulse rate establishing a rate of pump element reciprocation as a linear or other predetermined function of the value of the control signal.

What is claimed is:

1. An analog electrical signal-controlled pump having a reciprocating pumping element pulse-operated means for reciprocating said pumping element at a rate proportional to the pulse rate of operating pulses supplied thereto pulse-generator means connected to said pulse-operated means for generating operating pulses at a multiplicity of predetermined rates from a zero rate to a maximum rate pulse generator control means connected to said pulse-generator means and responsive to an analog electrical control signal to provide a predetermined pulse rate establishing a rate of pump element reciprocation as a predetermined function of said control signal, said control means including pump cutoff adjusting means for establishing a predetermined value of said control signal providing a zero pulse rate for cutting off flow through said pump.

2. A pump as claimed in claim 1 wherein said control means further includes pump rate adjusting means for establishing a predetermined value of rate of change of said pulse rate with change of said control signal for varying the rate of change of flow through said pump in response to a change in said control signal.

3. A pump as claimed in claim 2 further including pump stroke adjusting means for adjusting the stroke of said reciprocating element for establishing a predetermined pumping volume per stroke of said pump.

4. An analog electrical signal controlled pump having a reciprocating pumping element pulse-operated means for reciprocating said pumping element at a rate proportional to the pulse rate of operating pulses supplied thereto pulse-generator means connected to said pulse-operated means for generating operating pulses at a multiplicity of predetermined rates from a zero rate to a maximum rate pulse generator control means connected to said pulse-generator means and responsive to an analog electrical control signal to provide a multiplicity of predetermined pulse rates establishing a rate of pump element reciprocation as a predetermined function of said control signal, said control means including pump cutoff-adjusting means including an adjustable resistor for establishing a predetermined value of said control signal providing a zero pulse rate for cutting off flow through said pump and pump rate adjusting means including an adjustable resistor for establishing a predetermined value of rate of change of said pulse rate with change of said control signal for varying the rate of change of flow through said pump in response to a change in said control signal.

5. An analog electrical signal controlled pump as claimed in claim 4 wherein said pulse generator control means further includes a transistor connected to said adjustable resistors and resistor means connected to said transistor for operation thereof in its generally linear operating region.